H. C. NEWCOMB.
STUFFED FRUIT.
APPLICATION FILED MAY 7, 1917.

1,231,286. Patented June 26, 1917.

INVENTOR
HORACE C. NEWCOMB
BY HIS ATTORNEY
Harry Smith

UNITED STATES PATENT OFFICE.

HORACE C. NEWCOMB, OF PHILADELPHIA, PENNSYLVANIA.

STUFFED FRUIT.

1,231,286. Specification of Letters Patent. Patented June 26, 1917.

Application filed May 7, 1917. Serial No. 166,870.

*To all whom it may concern:*

Be it known that I, HORACE C. NEWCOMB, a citizen of the United States, residing in Philadelphia, Pennsylvania, have invented certain Improvements in Stuffed Fruit, of which the following is a specification.

My invention relates to stuffed fruit and particularly to such stuffed fruit as is shown and described in my United States Letters Patent No. 1,133,054, dated March 23, 1915, the object of my present invention being to produce a stuffed fruit of that type in such a way that it will consist of a greater variety of edible substances than before and will present a more pleasing and attractive external appearance. Hereafter, for the sake of convenience, I shall refer to the fruit as an "olive," it being understood, however, that other fruits, such as plums, cherries, or the like, may be used.

My invention is illustrated in the accompanying drawing, in which—

Figure 9:
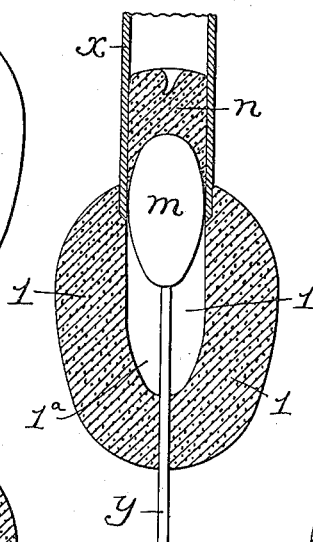

Figs. 5 to 8, inclusive, are plan views of stuffed olives prepared in accordance with other modified forms of my invention, and Fig. 9 is a vertical section through an olive showing the process by which it is prepared for stuffing.

During the time that I have been preparing olives in accordance with my above mentioned patent I have ascertained that many different vegetables, fruits, nuts and sea foods are adapted to be used for the stuffing and plug referred to therein. For instance, such edible substances as mint, celery, celeriac, water-cress, radishes, peppers; the skins of grape-fruit, oranges and lemons; peanuts, almonds, butter-nuts, walnuts; lobster-meat, crab-meat, caviar, roe, anchovies, sardines, salmon, shrimp, and many others may be combined with the olive and result in the production of a most appetizing article of food. The stuffing of the olive may consist of any of the above mentioned substances or of a combination thereof. Furthermore, many of them are of such a consistency as to be available for use as the plug, and the specific object of my present invention is to construct the plug of two or more different substances in order that the ultimate stuffed fruit will consist of a greater variety of different edible substances than has hitherto been the case.

The preparation of the olive for stuffing is preferably effected by the same method as described in my previous patent. This method, see Fig. 9, consists of first inserting through the skin and into the pulp of the olive 1 a tubular cutter $x$ through which the pit $m$ together with the pulp $n$ thereabove is ejected by means of a plunger $y$ introduced from below. The cutter and plunger are then withdrawn and the olive 1 with its central cavity $1^a$ is ready for the reception of the stuffing and plug.

Figure 3:
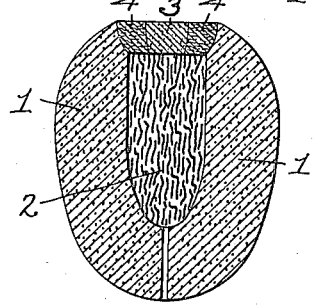
Fig. 3 is a vertical section through the olive shown in Fig. 1.
Figure 4:
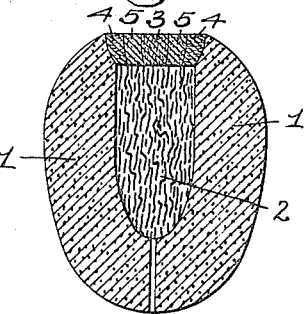
Fig. 4 is a similar section through the olive shown in Fig. 2.
Figure 6:
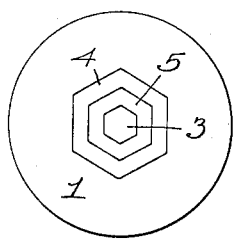
Figure 5:
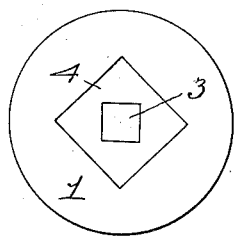
Figure 7:
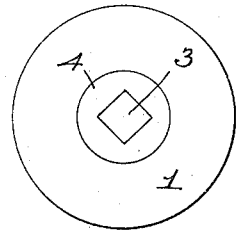
Figure 8:
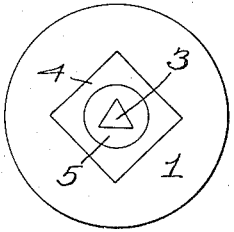

As before, the cavity $1^a$ is filled with edible stuffing 2, see Figs. 3 and 4, and the stuffing is retained therein by means of an edible plug inserted into the mouth of the cavity, this plug completely filling said mouth, and, as a result of its frictional grip upon the walls of the cavity, being proof against accidental dislodgment.

Figure 1:
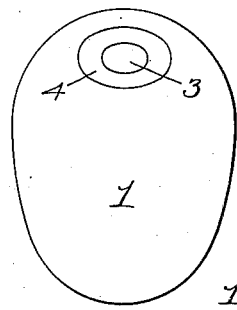
Figure 1 is a perspective view of a stuffed olive prepared in accordance with my invention.
Figure 2:
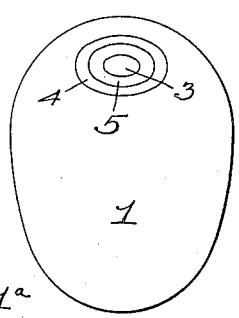
Fig. 2 is a similar view of a stuffed olive prepared in accordance with a modified form of my invention.

In Figs. 1 and 3 I have shown the plug as being circular in form and consisting of a circular inner member 3 surrounded by an outer ring member 4. These members are frictionally held in engagement with one another. In Figs. 2 and 4 I have shown a similar plug consisting of three members, there being, in addition to the inner and outer members 3 and 4, an intermediate ring member 5. There is practically no limit to the number of geometric forms in which these plugs may be built up. As examples, in Fig. 5 I have shown a square within a square; in Fig. 6, a hexagon within a hexagon; in Fig. 7, a square within a circle; and in Fig. 8, a triangle within a circle within a square.

If the various members of which the plug consists are, in addition to being of different substances, of substances of contrasting color, the resultant article of food will be not only more pleasing to the taste but more attractive to the eye than are such articles as hitherto prepared. For instance, if the olive shown in Figs. 1 and 3 has a plug consisting of a member 3 of pepper and a member 4 of celeriac the color effect will be red on white on dark green. Many other attractive color combinations can be easily secured.

While I have shown plugs of two and three members, and although even more can be used, I prefer the two-member plug as it is more readily and more economically made and, after being made, is easier to insert and less likely to break up while being handled.

I claim:

1. A stuffed fruit having the cavity originally occupied by the pit filled with edible stuffing material and having the mouth of said cavity closed by a plug which fits snugly to the walls of the cavity, said plug consisting of a plurality of different edible members.

2. A stuffed fruit having the cavity originally occupied by the pit filled with edible stuffing material and having the mouth of said cavity closed by a plug which fits snugly to the walls of the cavity, said plug consisting of a plurality of different edible concentric members.

3. A stuffed fruit having the cavity originally occupied by the pit filled with edible stuffing material and having the mouth of said cavity closed by a plug which fits snugly to the walls of the cavity, said plug consisting of two different edible members.

4. A stuffed fruit having the cavity originally occupied by the pit filled with edible stuffing material and having the mouth of said cavity closed by a plug which fits snugly to the walls of the cavity, said plug consisting of two different edible concentric members.

In testimony whereof, I have signed my name to this specification.

HORACE C. NEWCOMB.

Witnesses:
MARTHA A. DUFFIELD,
JOSEPH E. KEES.